Patented May 23, 1950

2,508,600

UNITED STATES PATENT OFFICE 2,508,600

GYPSUM PLASTER COMPOSITION

John J. Fitzsimmons, Clarence Center, N. Y., assignor to National Gypsum Company, Buffalo, N. Y., a corporation of Delaware No Drawing. Application August 18, 1947, Serial No. 769,319

1 Claim. (Cl. 106—111)

This invention relates to gypsum plaster composition and more particularly to a so-called "blocking plaster" possessing the necessary properties required for holding optical articles while being ground.

Although calcined gypsum has been widely used in the industry for this purpose, its faults do not permit its use in precision work where great accuracy is essential. Ordinary calcined gypsum known as plaster of Paris has a very high expansion during setting, this being in the order of from 0.002" to 0.0025" per inch, produces a temperature rise of 30 to 40° F. during the process of setting, and develops a comparatively high early strength which increases greatly on drying.

In the case of steam calcined gypsum known in the art as alpha gypsum, it has an even higher expansion during setting, this being about 0.005" per inch, as well as developing a higher temperature during setting of about 50° F., and a higher early and final strength. For these reasons alpha gypsum is unsuitable in the practice of the present invention.

These are all factors which determine the usefulness of the material employed. The high temperature developed during setting is quite likely to change the physical characteristics of the optical glass and, in addition, melt the paraffine which protects the same.

A high degree of expansion during setting is very likely to force the object to be ground out of position, thereby causing inaccurate grinding.

Since the optical article is eventually removed from the plaster in which it is embedded, a plaster having too great a strength would make removal difficult and likely cause damage during this operation.

It is, therefore, the object of this invention to provide a plaster composition having a greatly reduced rate of expansion upon setting.

Another object is a plaster composition characterized by a low temperature rise during the setting phase.

A still further object is a plaster composition possessing medium strength when set.

These and other objects of the invention will be apparent when reference is made to the description thereof which follows:

It has been found that a plaster composition containing the following ingredients in the range of proportions indicated is a useful "blocking plaster" for precision optical work.

| Material: | Parts by weight |
|---|---|
| Calcined gypsum (plaster of Paris) | 650–1,000 |
| Anhydrous gypsum (Keene's cement) | 150– 250 |
| Terra alba | 25– 50 |
| Hydrated lime | 10– 20 |
| Sodium citrate | 1– 3 |

The anhydrous gypsum acts to reduce the temperature rise during setting, to reduce expansion, and to lower early strength. Both the hydrated lime and the sodium citrate further reduce expansion during setting. Terra alba acts as an accelerator and is added to control the time of setting. If desired, such salts as potassium sulfate, ammonium sulfate, nitre cake, alum or the like may also be added to control the setting time.

A plaster composition made in accordance with the above formula has a total temperature rise during setting of 20 to 25° F., an expansion of from about 0.00015" to 0.00025" per inch during setting, and is of such strength that the optical articles are firmly held during the grinding or polishing operation but may be readily removed without breakage when the operation is complete.

Having thus described the invention, what is claimed as new and desired to be secured by Letters Patent is:

A gypsum plaster composition, comprising 650 to 1,000 parts by weight of plaster of Paris, 150 to 250 parts by weight of anhydrous gypsum, 25 to 50 parts by weight of terra alba, 10 to 20 parts by weight of hydrated lime, and 1 to 3 parts by weight of sodium citrate.

JOHN J. FITZSIMMONS.

REFERENCES CITED

The following references are of record in the file of this patent:

UNITED STATES PATENTS

| Number | Name | Date |
|---|---|---|
| 1,960,538 | Hoggatt | May 29, 1934 |
| 2,216,555 | King | Oct. 1, 1940 |
| 2,358,701 | Gardner | Sept. 19, 1944 |
| 2,416,035 | Whittier | Feb. 18, 1947 |

FOREIGN PATENTS

| Number | Country | Date |
|---|---|---|
| 783,074 | France | 1935 |